US008886037B2

(12) United States Patent
Konishi et al.

(10) Patent No.: US 8,886,037 B2
(45) Date of Patent: Nov. 11, 2014

(54) WAVEFORM RECONSTRUCTION DEVICE, WAVEFORM RECONSTRUCTION SYSTEM, AND WAVEFORM RECONSTRUCTION METHOD

(75) Inventors: Tsuyoshi Konishi, Osaka (JP); Takuya Kato, Osaka (JP); Hiroomi Goto, Osaka (JP)

(73) Assignee: Osaka University, Osaka (JP)

( * ) Notice: Subject to any disclaimer, the term of this patent is extended or adjusted under 35 U.S.C. 154(b) by 537 days.

(21) Appl. No.: 13/254,624

(22) PCT Filed: Mar. 2, 2010

(86) PCT No.: PCT/JP2010/001397
§ 371 (c)(1),
(2), (4) Date: Sep. 2, 2011

(87) PCT Pub. No.: WO2010/100891
PCT Pub. Date: Sep. 10, 2010

(65) Prior Publication Data
US 2011/0311223 A1    Dec. 22, 2011

(30) Foreign Application Priority Data

Mar. 2, 2009 (JP) ................................ 2009-048608

(51) Int. Cl.
H04B 10/08      (2006.01)
G01J 3/02       (2006.01)
G01J 11/00      (2006.01)

(52) U.S. Cl.
CPC ............... *G01J 11/00* (2013.01); *G01J 3/0218* (2013.01); *G01J 3/0213* (2013.01); *G01J 3/02* (2013.01); *G01J 3/0245* (2013.01)
USPC .................... 398/38; 398/13; 398/28

(58) Field of Classification Search
USPC ......................... 398/13, 28, 33, 38
See application file for complete search history.

(56) References Cited

U.S. PATENT DOCUMENTS 6,456,380 B1 * 9/2002 Naganuma ................... 356/450
6,885,683 B1   4/2005 Fermann et al.
(Continued)

FOREIGN PATENT DOCUMENTS

JP         3018173      3/2000
JP      2002-118315    4/2002
(Continued)

OTHER PUBLICATIONS

International Search Report issued Apr. 6, 2010 in International (PCT) Application No. PCT/JP2010/001397.
(Continued)

*Primary Examiner* — Dzung Tran
(74) *Attorney, Agent, or Firm* — Wenderoth, Lind & Ponack, L.L.P.

(57) ABSTRACT

Provided is a waveform reconstruction device capable of easily reconstructing an accurate time waveform of an optical signal without using an ultrafast time gate or a reference light source. A waveform reconstruction device (140) includes: a phase spectrum calculation unit (143) which (i) calculates a power spectrum of an output optical signal for each of a plurality of intensities of an input optical signal, when a phase spectrum of the input optical signal having the plurality of intensities is assumed to have a given phase spectrum, by simulating, using a parameter related to self-phase modulation of an optical fiber, propagation of the input optical signal through the optical fiber, and (ii) calculates, as the phase spectrum of the input optical signal, the given phase spectrum when a difference value between the calculated power spectrum and a measured power spectrum is equal to or less than a threshold value; and a waveform reconstruction unit (144) which reconstructs the time waveform of the input optical signal by performing frequency-time transform on the calculated phase spectrum and the power spectrum of the input optical signal.

6 Claims, 9 Drawing Sheets

(56) References Cited

U.S. PATENT DOCUMENTS

| | | |
|---|---|---|
| 2004/0213302 A1 | 10/2004 | Fermann et al. |
| 2005/0018714 A1 | 1/2005 | Fermann et al. |
| 2005/0111500 A1 | 5/2005 | Harter et al. |
| 2005/0163426 A1 | 7/2005 | Fermann et al. |
| 2005/0219543 A1 | 10/2005 | Uehara et al. |
| 2006/0056468 A1* | 3/2006 | Dantus et al. ............ 372/28 |
| 2006/0198398 A1 | 9/2006 | Fermann et al. |
| 2007/0103765 A1 | 5/2007 | Fermann et al. |
| 2008/0232407 A1 | 9/2008 | Harter et al. |
| 2009/0012790 A1* | 1/2009 | Yamada et al. ............ 704/251 |
| 2009/0207401 A1* | 8/2009 | Ozcan et al. ............ 356/73.1 |
| 2010/0046066 A1 | 2/2010 | Fermann et al. |
| 2010/0046067 A1 | 2/2010 | Fermann et al. |
| 2010/0098117 A1 | 4/2010 | Fermann et al. |
| 2010/0195677 A1 | 8/2010 | Fermann et al. |
| 2011/0200061 A1 | 8/2011 | Harter et al. |

FOREIGN PATENT DOCUMENTS

| | | |
|---|---|---|
| JP | 2005-106751 | 4/2005 |
| JP | 2005-315858 | 11/2005 |
| WO | 2005/017955 | 2/2005 |
| WO | 2005/048417 | 5/2005 |
| WO | 2006/042312 | 4/2006 |
| WO | 2006/102056 | 9/2006 |

OTHER PUBLICATIONS

Patent Cooperation Treaty (PCT) International Preliminary Report on Patentability issued Sep. 13, 2011 in International (PCT) Application No. PCT/JP2010/001397.

D. J. Kane, et al., "*Characterization of Arbitrary Femtosecond Pulses Using Frequency-Resolved Optical Gating*", IEEE Journal of Quantum Electronics, vol. 29, No. 2, Feb. 1993, pp. 571-579.

C. Dorrer, et al., "*Characteriazation of the spectral phase of ultrashort light pulses*", C.R. Acad. Sci. Paris, Serie IV, 2001, pp. 1415-1426.

M. Sato et al., "*Adaptive Pulse Shaping of Femtosecond Laser Pulses in Amplitude and Phase through a Single-Mode Fiber by Referring to Frequency-Resolved Optical Gating Patterns*", Japanese Journal of Applied Physics, vol. 41, Part 1, No. 6A, Jun. 2002, pp. 3704-3709.

C. Dorrer et al., "*Highly sensitive direct characterization of femtosecond pulses by electro-optic spectral shearing interferometry*", Optics Letters, vol. 28, No. 6, 2003, pp. 477-479.

H. Goto et al., "[*Encouragement Talk*] *All-optical limiter based on signal form transformation—In search of ideal limiting characteristics-*", IEICE Technical Report, vol. 108, No. 476, 2009, pp. 23-28.

K. Kawanishi et al., "*Study on stabilization in optical signal processing by a highly accurate optical limiter based on equilibrium of nonlinear optical effect*", IEICE general conference, Mar. 17-20, 2009, p. 487 with English translation.

* cited by examiner

FIG. 9 ic field and the like which reconstruct a time waveform of an optical signal.

WAVEFORM RECONSTRUCTION DEVICE, WAVEFORM RECONSTRUCTION SYSTEM, AND WAVEFORM RECONSTRUCTION METHOD

TECHNICAL FIELD

The present invention relates to a waveform reconstruction device and the like which reconstruct a time waveform of an optical signal.

BACKGROUND ART

In recent years, obtaining accurate information on a time waveform of an optical signal is significantly important in working toward a practical use of information and communication systems utilizing a nonlinear optical effect. Thus, an intensity distribution of the time waveform of an optical signal is measured using an optical sampling oscilloscope, autocorrelator, and so on, in order to obtain accurate information on the time waveform of the optical signal. As a result, amplitude information of the optical signal is obtained from the measured intensity distribution. However, phase information of the optical signal cannot be obtained from the measured intensity distribution. More specifically, information on the time waveform of the optical signal cannot be obtained by merely measuring the intensity distribution of the optical signal.

In view of the above, various methods have been proposed for obtaining a phase of an optical signal (see Non Patent Literatures 1 and 2, for example). The methods disclosed by Non Patent Literatures 1 and 2 are methods for obtaining a phase of an optical signal based on time-resolved spectroscopy. More specifically, the phase of an optical signal is obtained using an ultrafast time gate or a reference light source in the methods according to Non Patent Literatures 1 and 2. Then, the time waveform of the optical signal is reconstructed using the obtained phase.

CITATION LIST

Non Patent Literature

[NPL 1]
D. J. Kane, R. Trebino, "Characterization of arbitrary femtosecond pulses using frequency-resolved optical gating", IEEE J. Quantum Electron, Vol. 29, 1993, pp 571 to pp 579
[NPL 2]
C. Dorrer, M. Joffre, "Characterization of the spectral phase of ultrashort light pulses", C. R. Acad. Sci. Paris, Vol. 2, 2001, pp 1415

SUMMARY OF INVENTION

Technical Problem

However, the above-described conventional methods need the ultrafast time gate or the reference light source, and thus a significantly high technical level is required, such as temporal adjustment for an optical signal and gate and ensuring stability and a signal-noise (SN) ratio, and so on.

In view of the above, an object of the present invention is to provide a waveform reconstruction device capable of easily reconstructing a time waveform of an optical signal.

Solution to Problem

In order to achieve the object described above, a waveform reconstruction device according to an aspect of the present invention is a waveform reconstruction device which reconstructs a time waveform of an input optical signal, the waveform reconstruction device comprising: an input spectrum obtaining unit configured to obtain a power spectrum of the input optical signal; an output spectrum obtaining unit configured to obtain, as a measured power spectrum, a power spectrum for each of a plurality of intensities of the input optical signal, the power spectrum being obtained by measuring an output optical signal that is output after the input optical signal propagates through an optical fiber that induces self-phase modulation; a phase spectrum calculation unit configured to (i) calculate as a calculated power spectrum, for each of the plurality of intensities of the input optical signal, a power spectrum of the output optical signal when a phase spectrum of the input optical signal having the plurality of intensities is assumed to have a given phase spectrum, by simulating the propagation of the input optical signal through the optical fiber using a parameter related to the self-phase modulation of the optical fiber, and (ii) calculate as the phase spectrum of the input optical signal, the given phase spectrum when a difference value between the calculated power spectrum and the measured power spectrum is equal to or less than a threshold; and a waveform reconstruction unit configured to reconstruct a time waveform of the input optical signal by performing frequency-time transform on the phase spectrum calculated by the phase spectrum calculation unit and the power spectrum obtained by the input spectrum obtaining unit.

The above-described configuration allows reconstruction of the time waveform of an input optical signal using the power spectrum of an output optical signal that is output after the input optical signal propagates through the optical fiber which induces self-phase modulation, and thus it is possible to easily reconstruct the time waveform of an optical signal.

In addition, the phase spectrum calculation unit may search, changing the given phase spectrum according to a predetermined algorithm, for the given phase spectrum when the difference value becomes equal to or less than the threshold so as to calculate the phase spectrum of the input optical signal.

This allows searching, while changing the phase spectrum according to a predetermined algorithm, for the difference value equal to or less than a threshold and thus it is possible to obtain a phase spectrum with high accuracy in a relatively short amount of time.

In addition, a waveform reconstruction system according to an aspect of the present invention is a waveform reconstruction system for reconstructing a time waveform of an input optical signal, the waveform reconstruction system comprising: an intensity adjuster which changes an intensity of the input optical signal into a plurality of intensities different from each other; an optical fiber which induces self-phase modulation of an optical signal that propagates through the optical fiber and which has a known parameter related to the self-phase modulation; a spectral measurement device which measures a power spectrum of an output optical signal for each of the plurality of intensities, the output optical signal being output after the input optical signal whose intensity has been changed by the intensity adjuster propagates through the optical fiber; and the above-described waveform reconstruction device according to claim 1, wherein the output spectrum obtaining unit is configured to obtain, as the measured power spectrum, the power spectrum measured by the spectral measurement device.

This allows reconstruction of the time waveform of the input optical signal only with the optical fiber having the known parameter and the spectrometer, and thus the ultrafast time gate or the reference light need not necessarily be included. This means that it is possible to easily reconstruct the time waveform of the optical signal.

In addition, it is preferable that the optical fiber has known parameters related to self-phase modulation of at least second-order dispersion, third-order dispersion, and fourth-order dispersion.

This allows reconstruction of the time waveform of the optical signal with higher accuracy.

It is to be noted that the present invention can be implemented not only as a waveform reconstruction device as described above but also as a waveform reconstruction method including, as steps, operations performed by characteristic elements included in the waveform reconstruction device. Furthermore, the present invention can be implemented as a program which causes a computer to execute each of the steps included in the waveform reconstruction method. It should be understood that such a program can be distributed via a recording medium such as a compact disc-read only memory (CD-ROM) and a transmission medium such as the Internet.

Advantageous Effects of Invention

As clearly described above, the waveform reconstruction device according to an aspect of the present invention can reconstruct the time waveform of an input optical signal using a power spectrum of an output optical signal that is output after the input optical signal propagates through an optical fiber which induces self-phase modulation, and thus it is possible to easily reconstruct the time waveform of an optical signal.

DESCRIPTION OF EMBODIMENTS

A waveform reconstruction system and a waveform reconstruction device according to an aspect of the present invention reconstruct a time waveform of an input optical signal, utilizing the characteristics of a nonlinear optical effect; that is, the time waveform corresponding to a combination of spectrum changes is restricted. More specifically, the waveform reconstruction system and the waveform reconstruction device compare, between a measured value and a calculated value, spectrum changes caused by the nonlinear optical effect and obtained when changing the intensity of an input optical signal, and reconstruct the time waveform of the input optical signal using the comparison result. The phase spectrum necessary for reconstructing the time waveform is determined by changing the phase spectrum such that a calculated power spectrum (calculated value), which is calculated through simulation according to an optimization algorithm such as simulated annealing, approximates a measured power spectrum (measured value).

The following describes an embodiment of the present invention with reference to the drawings.

Figure 1:
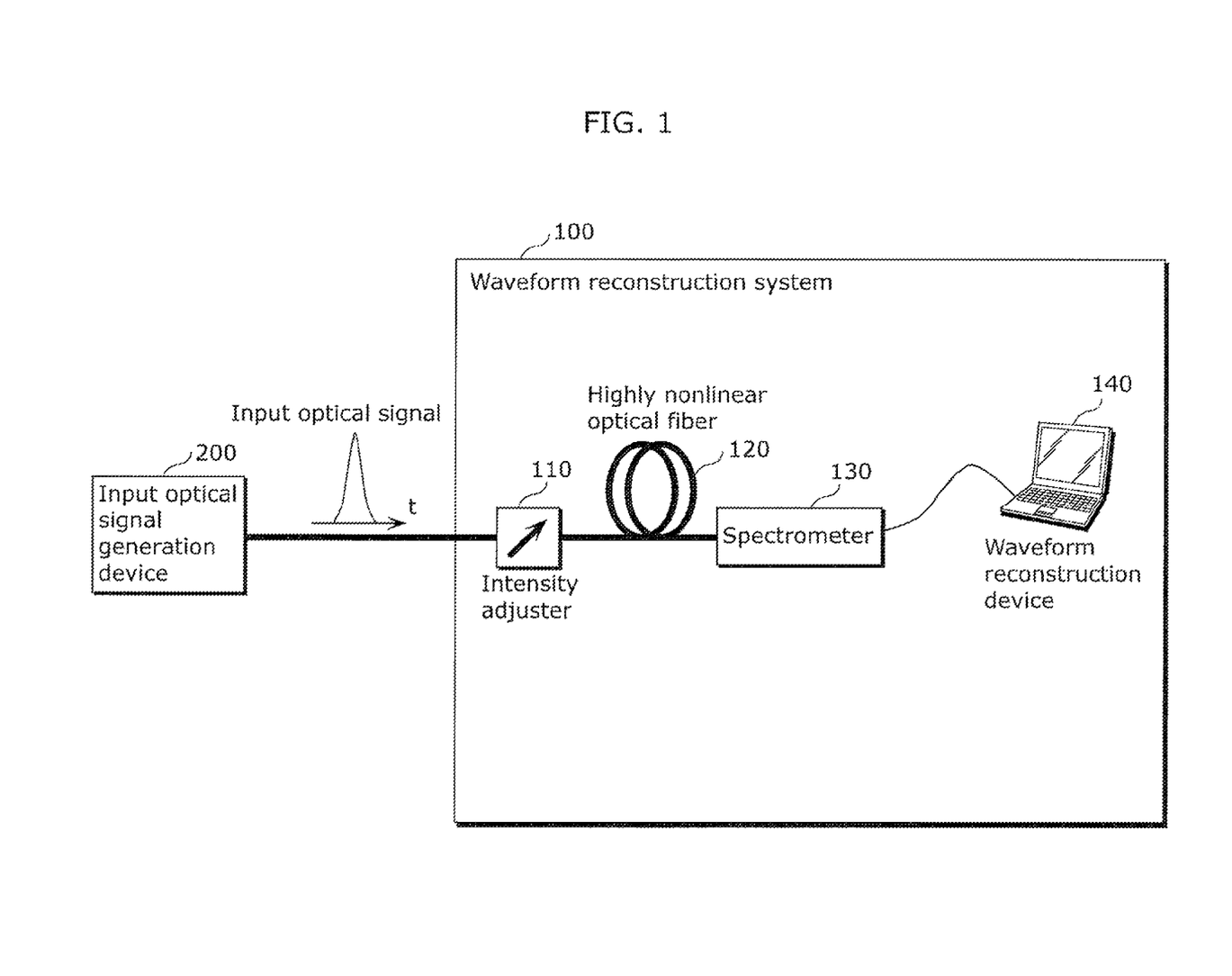
FIG. 1 is a diagram which illustrates an overall configuration of a waveform reconstruction system according to an embodiment of the present invention.

FIG. 1 is a diagram which illustrates an overall configuration of a waveform reconstruction system 100 according to an embodiment of the present invention. The waveform reconstruction system 100 is a system which reconstructs a time waveform of an input optical signal. As illustrated in FIG. 1, the waveform reconstruction system 100 includes: an intensity adjuster 110; a highly nonlinear optical fiber 120; a spectrometer 130; and a waveform reconstruction device 140.

The intensity adjuster 110 changes an intensity of an input optical signal generated by an input optical signal generation device 200.

The highly nonlinear optical fiber 120, which is an example of an optical fiber, induces self-phase modulation of an optical signal that propagates through the highly nonlinear optical fiber 120. Here, the self-phase modulation is an example of a nonlinear optical effect. A refractive index of a medium such as an optical fiber slightly changes in proportion to the intensity of an optical signal that propagates therethrough, and thus phase modulation occurs in the optical signal itself. The phase modulation which occurs in the above-described manner is referred to as self-phase modulation.

In addition, the highly nonlinear optical fiber 120 is a fiber having a known parameter related to the self-phase modulation. More specifically, the highly nonlinear optical fiber 120 is, for example, an optical fiber having known parameters indicating, in addition to a second-order and a third-order, a fourth-order dispersion. An input optical signal whose intensity is changed by the intensity adjuster 110 propagates through the highly nonlinear optical fiber 120.

The spectrometer 130, which is an example of a spectral measurement device, generates a power spectrum represented by a digital value, by decomposing an output optical signal by wavelength into lights and performing optical-to-electrical (O/E) conversion and analog-to-digital (A/D) conversion on the lights decomposed per wavelength. This means that the spectrometer 130 measures a power spectrum of an output optical signal. It is to be noted here that the output optical signal is an optical signal that is output after an input optical signal propagates through the highly nonlinear optical fiber 120.

Figure 10:
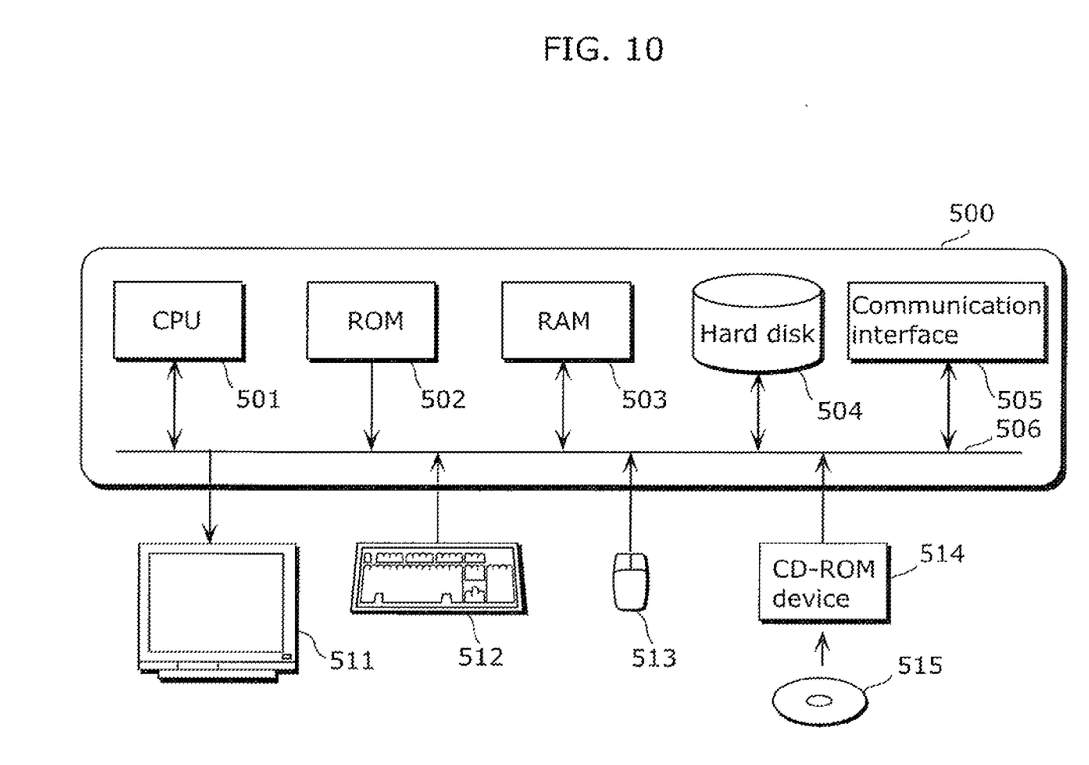
FIG. 10 is a diagram illustrating an example of a hardware configuration of a computer.

The waveform reconstruction device 140 is implemented as, for example, a computer shown in FIG. 10 and reconstructs a time waveform of an input optical signal. The waveform reconstruction device 140 will be described later in detail with reference to FIG. 2.

The input optical signal generation device 200 is a device which generates an input optical signal. More specifically, the input optical signal generation device 200 includes, for example, a mode-locked laser diode (MLLD), a single mode fiber (SMF), and an erbium doped fiber amplifier (EDFA). The input optical signal generation device 200 performs dispersion compensation on a light pulse output from the MLLD using the SMF and amplifies the light pulse using the EDFA.

Figure 2:
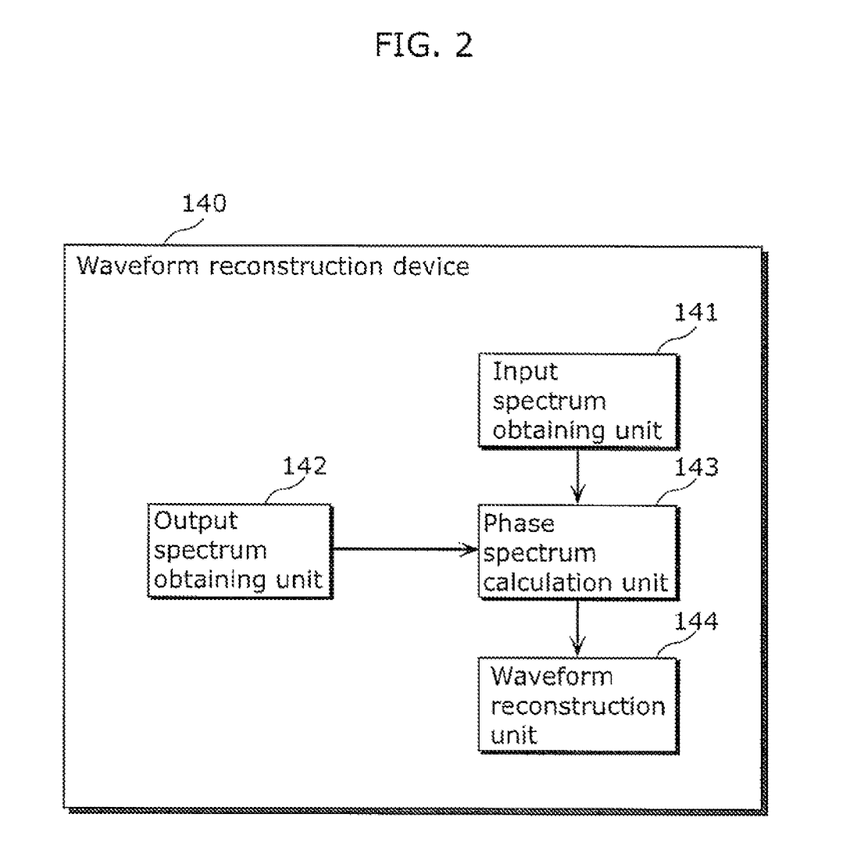
FIG. 2 is a block diagram which illustrates a characteristic functional configuration of the waveform reconstruction device according to an embodiment of the present invention.

FIG. 2 is a block diagram which illustrates a characteristic functional configuration of the waveform reconstruction device 140 according to an embodiment of the present invention. As shown in FIG. 2, the waveform reconstruction device 140 includes: an input spectrum obtaining unit 141; an output spectrum obtaining unit 142; a phase spectrum calculation unit 143; and a waveform reconstruction unit 144.

The input spectrum obtaining unit 141 obtains a power spectrum of the input optical signal generated by the input optical signal generation device 200. For example, when the power spectrum of the input optical signal generated by the input optical signal generation device 200 is a known power spectrum, the input spectrum obtaining unit 141 obtains the power spectrum of the input optical signal by reading data on the power spectrum which is stored in storage means and the like. On the other hand, when the power spectrum of the input optical signal generated by the input optical signal generation device 200 is an unknown power spectrum, the input spectrum obtaining unit 141 obtains the power spectrum of the input optical signal, which is measured using a not-illustrated spectrometer or the like. It is to be noted that the power spectrum obtained by the input spectrum obtaining unit 141 is data indicating an optical intensity for each of the wavelengths of the input optical signal.

The output spectrum obtaining unit 142 obtains, as a measured power spectrum, a power spectrum which (i) is a power spectrum of an output optical signal that is output after the input optical signal propagates through the highly nonlinear optical fiber 120 and (ii) is measured by the spectrometer 130, for each of a plurality of intensities of the input optical signal. Here, the measured power spectrum is data that indicates an optical intensity for each of the wavelengths of the output optical signal.

The phase spectrum calculation unit 143 calculates, as a calculated power spectrum, a power spectrum of the output optical signal when a phase spectrum of the input optical signal having the plurality of intensities is assumed to have a given phase spectrum, by simulating the propagation of the input optical signal through the highly nonlinear optical fiber 120, using a parameter. Then, the phase spectrum calculation unit 143 calculates, as the phase spectrum of the input optical signal, a given phase spectrum when the difference value between the calculated power spectrum for each of the plurality of intensities and the measured power spectrum for each of the plurality of intensities obtained by the output spectrum obtaining unit 142 is equal to or less than a threshold. More specifically, the phase spectrum calculation unit 143 searches for the given phase spectrum when the difference value becomes equal to or less than the threshold while changing the given phase spectrum according to simulated annealing, thereby calculating the phase spectrum of the input optical signal.

It is to be noted that the phase spectrum calculated by the phase spectrum calculation unit 143 is data indicating a phase of each of the wavelengths of the optical signal. In addition, the parameter is a parameter related to self-phase modulation and unique to the highly nonlinear optical fiber 120. Furthermore, the simulation performed by the phase spectrum calculation unit 143 is a pulse propagation simulation using, for example, a split-step method. More specifically, the simulation performed by the phase spectrum calculation unit 143 is an optical signal propagation simulation for calculating a power spectrum of an output optical signal by using a known parameter unique to the highly nonlinear optical fiber 120.

In addition, the threshold described above may be a constant value that is specified in advance or maybe a value that dynamically changes during the simulation. For example, the threshold may be a difference value obtained when a convergence condition of a solution for which sequentially searched by simulated annealing is satisfied (when the rate of change of the solution becomes equal to or less than a predetermined rate of change, for example). Furthermore, the threshold may be, for example, a difference value that is obtained when a solution is searched for, for predetermined times.

The waveform reconstruction unit 144 performs frequency-time transform on the phase spectrum calculated by the phase spectrum calculation unit 143 and the power spectrum obtained by the input spectrum obtaining unit 141, thereby reconstructing a time waveform of the input optical signal. More specifically, the waveform reconstruction unit 144 reconstructs the time waveform by performing, for example, inverse Fourier transform on the phase spectrum and the power spectrum.

The following describes various operations performed by the waveform reconstruction device 140 configured as described above.

Figure 3:
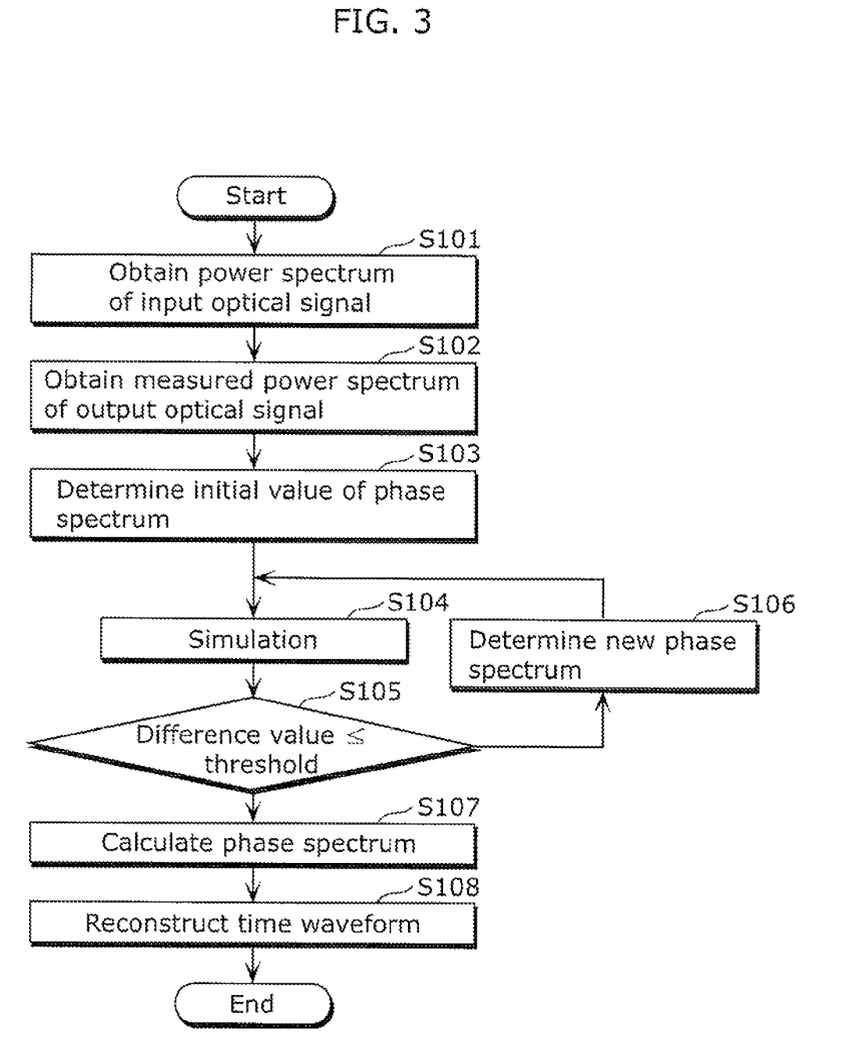
FIG. 3 is a flow chart which illustrates operations performed by the waveform reconstruction device according to an embodiment of the present invention.

FIG. 3 is a flow chart which illustrates operations performed by the waveform reconstruction device 140 according to an embodiment of the present invention.

First, the input spectrum obtaining unit 141 obtains a power spectrum of an input optical signal generated by the input optical signal generation device 200 (Step S101). Subsequently, the output spectrum obtaining unit 142 obtains, as measured power spectrums, power spectrums of the output optical signal which corresponds to a plurality of intensities of the input optical signal and is measured by the spectrometer 130 (Step S102).

Next, the phase spectrum calculation unit 143 determines a phase spectrum that is an initial value (Step S103). The phase spectrum calculation unit 143 determines, for example, an arbitrary phase spectrum as the initial value. Or, the phase spectrum calculation unit 143 may determine, as the initial value, a phase spectrum that is obtained when the input optical signal is assumed to have a pulse of a predetermined type, for example.

Then the phase spectrum calculation unit 143 simulates the propagation of the input optical signal through the highly nonlinear optical fiber 120, using the parameter related to self-phase modulation of the highly nonlinear optical fiber 120. With this, the phase spectrum calculation unit 143 calculates as a calculated power spectrum, for each of a plurality of intensities of the input optical signal, a power spectrum of the output optical signal when the input optical signal having the plurality of intensities is assumed to have the phase spectrum determined in Step S103 or Step S106 (Step S104).

Next, the phase spectrum calculation unit 143 determines whether or not a total of the difference value for each of the plurality of intensities between the calculated power spectrum for each of the plurality of intensities and the measured power spectrum for each of the plurality of intensities measured by the spectrometer 130 (obtained in Step S102) is equal to or less than the threshold (Step S105).

When it is determined that the total of the difference value is larger than the threshold (No in Step S105), the phase spectrum calculation unit 143 determines a new phase spectrum to be used for simulation, according to the simulated annealing (Step S106). Then, processes starting from Step S104 are repeated.

On the other hand, when it is determined that the difference value is equal to or less than the threshold (Yes in Step S105), the phase spectrum used for the simulation is calculated as a phase spectrum of the input optical signal (Step S107).

Lastly, a time waveform of the input optical signal is reconstructed by performing the frequency-time transform on the power spectrum of the input optical signal and the calculated phase spectrum (Step S108), and the process is terminated.

Through the processes described above, the waveform reconstruction device 140 can easily reconstruct the time waveform of the optical signal using the power spectrum of the output optical signal that is output after the input optical signal propagates through the optical fiber which induces self-phase modulation.

The following describes an experimental result obtained by the waveform reconstruction system 100 described above.

In the experiment, the input optical signal generation device 200 performed dispersion compensation using the SMF of 65 m on a light pulse of 1.3 ps output from the MLLD with a period of 10 GHz, and then amplified the light pulse using the EDFA. The input optical signal generation device 200 output, as the input optical signal, the light pulse amplified by the EDFA as described above.

A variable optical attenuator (VOA) was used as the intensity adjuster 110. The intensity adjuster 110 changed the intensity of the input optical signal generated by the input optical signal generation device 200 into ten different types of intensities, by increasing electrical power by 10.3 mW starting from 17.2 mW. Then the intensity adjuster 110 output, to the highly nonlinear optical fiber 120, the input optical signal whose intensity had been changed.

An optical fiber having a parameter indicated in Table 1, in which the fourth-order dispersion in addition to the second-order dispersion and the third-order dispersion was considered, was used as the highly nonlinear optical fiber 120.

TABLE 1

| | |
|---|---|
| Loss: $\alpha$ | 1.0 dB/km |
| 2nd order dispersion: $\beta_2$ | $+2.36 \times 10^{-2}$ ps$^2$/km |
| 3rd order dispersion: $\beta_3$ | $+4.72 \times 10^{-3}$ ps$^3$/km |
| 4th order dispersion: $\beta_4$ | $+2.90 \times 10^{-4}$ ps$^4$/km |
| Nonlinearily: $\gamma$ | 15.0/W/km |
| Fiber length: L | 92 m |

Figure 4:
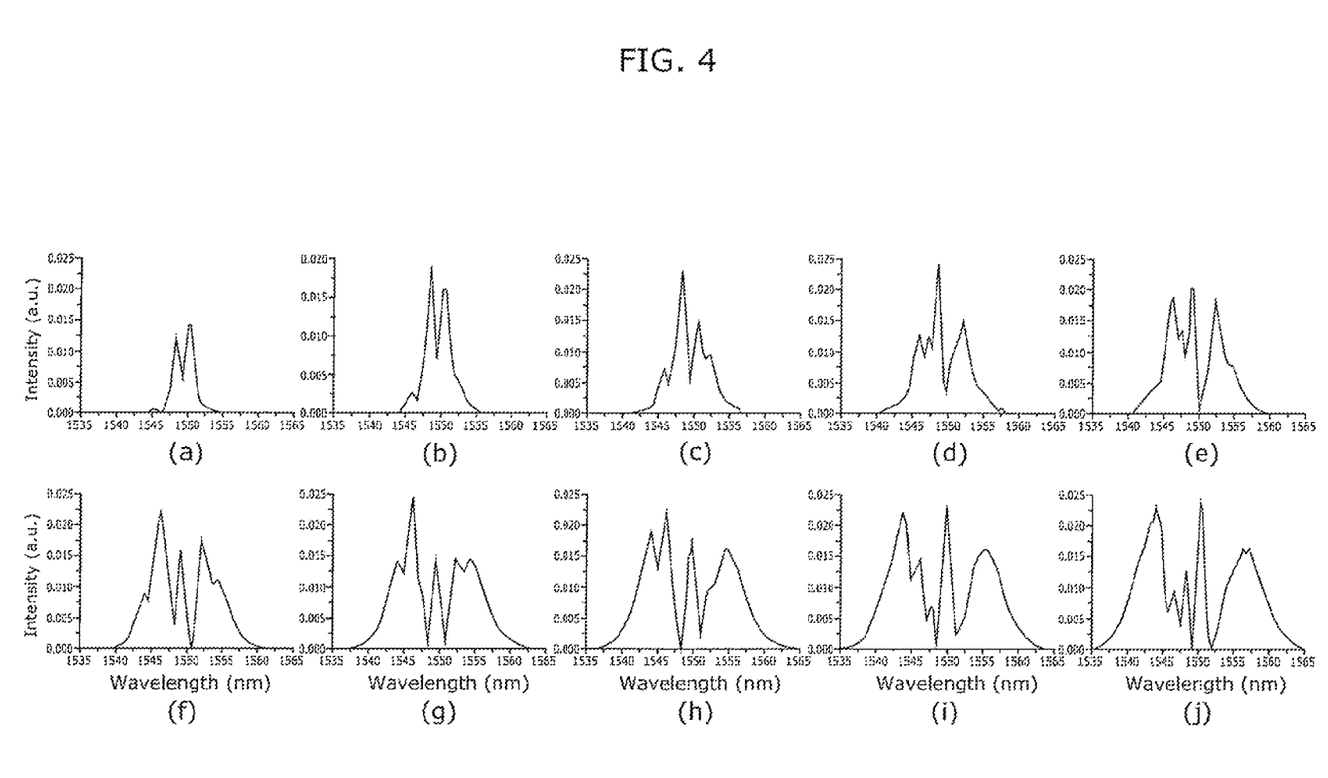
FIG. 4 is a graph showing an experimental result of a power spectrum of an output optical signal which is measured by a spectrometer.

(a) to (j) in FIG. 4 show power spectrums measured by the spectrometer 130. Each of the power spectrums has a corresponding one of the ten types of intensities of the input optical signal. In the diagram, the horizontal axis of each of the graphs represents a wavelength (Wavelength (nm)) and the vertical axis of each of the graphs represents an intensity (Intensity (a.u.)). In addition, the power spectrums shown in (a) to (j) in FIG. 4 are power spectrums of the output optical signal when the electrical power of the intensity adjuster 110 is 17.2 mW, 27.5 mW, 37.8 mW, 48.1 mW, 58.4 mW, 68.7 mW, 79.0 mW, 89.4 mW, 99.7 mW, and 110.0 mW, respectively.

In the present experiment, the phase spectrum calculation unit 143 included in the waveform reconstruction device 140 searched for a phase spectrum when an evaluation function becomes the smallest, while changing the phase spectrum according to the simulated annealing. The evaluation function is the difference value between the measured values of the power spectrums of the output optical signal, each of which has a corresponding one of the seven types of intensities (shown in (a) to (g) in FIG. 4) and the calculated values of the power spectrums of the output optical signal, which are obtained by the simulation. At this time, for an initial value of the phase spectrum, the phase spectrum at the time of the approximation to a Sech type light pulse using Gerchberg-Saxton method based on a pulse width obtained by auto correlation. Use of such a phase spectrum as the initial value allows early convergence of the evaluation function.

Figure 5:
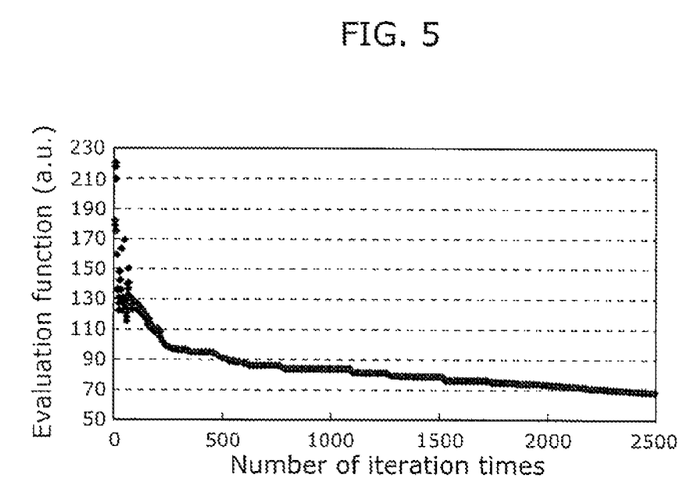
FIG. 5 is a graph showing an experimental result of changes in an evaluation function during a search for a phase spectrum.

FIG. 5 is a graph showing an experimental result of changes in an evaluation function during a search for a phase spectrum. In FIG. 5, the horizontal axis of the graph represents the number of iterated calculation times of the evaluation function and the vertical axis represents a value of the evaluation function (a. u.).

FIG. 5 clearly shows that the evaluation function converges to a constant value at relatively an early point. The phase spectrum calculation unit 143 determined the phase spectrum at the time when the evaluation function converged to the constant value (2500th in FIG. 5, for example) as the phase spectrum of the input optical signal.

Figure 6:
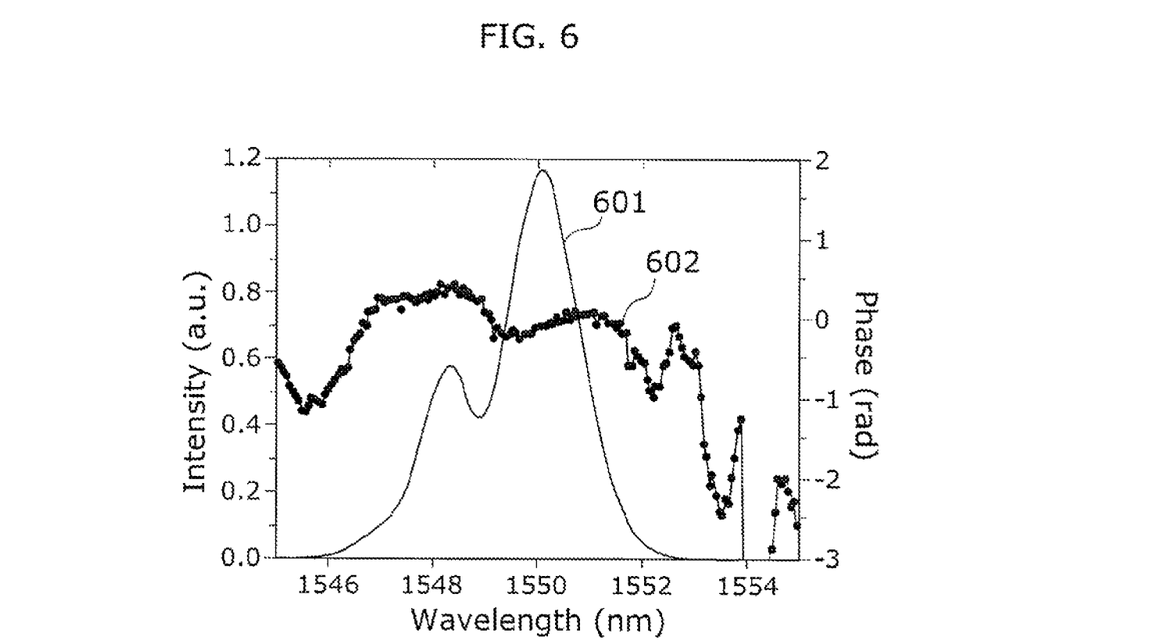
FIG. 6 is a diagram illustrating the power spectrum and the phase spectrum obtained in the experiment.

FIG. 6 is a diagram illustrating the power spectrum and the phase spectrum obtained in the experiment. In FIG. 6, the horizontal axis represents a wavelength (nm). Furthermore, vertical axes represent the intensity (a.u.) in the left side and the phase (rad) in the right side. Here, a power spectrum 601 corresponds to the intensity of the left vertical axis and a phase spectrum 602 corresponds to the phase of the right vertical axis.

The waveform reconstruction unit 144 included in the waveform reconstruction device 140 reconstructs the time waveform of the input optical signal, using the phase spectrum 602 and the power spectrum 601 of the input optical signal which are calculated as shown in FIG. 6.

Figure 7:
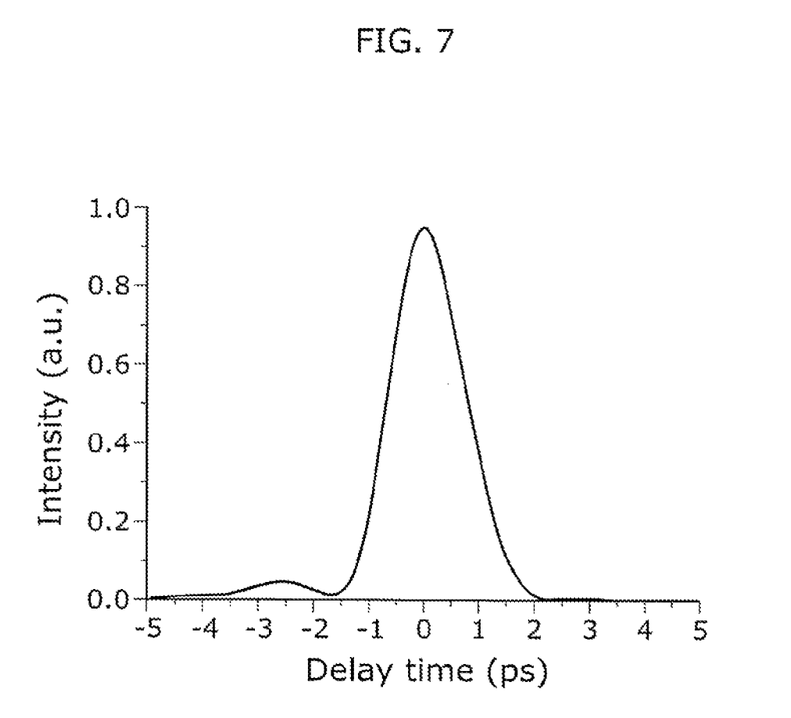
FIG. 7 is a diagram which shows an experimental result of a time waveform of an input optical signal which is reconstructed by the waveform reconstruction device.

FIG. 7 is a diagram which shows an experimental result of a time waveform of an input optical signal which is reconstructed by the waveform reconstruction device 140. In FIG. 7, the horizontal axis represents a delay time (ps) and the vertical axis represents the intensity (a.u.).

FIG. 7 clearly shows that the reconstructed time waveform of the input optical signal differs from a time waveform of the Sech type or the Gaussian type which are approximated as a general pulse light. Thus, it is considered that the waveform reconstruction device 140 succeeded in reconstructing the time waveform more accurately than a time waveform obtained by a general approximation.

Next, the validity of the simulation performed by the phase spectrum calculation unit 143 and the calculated phase spectrum in the above-described experiment is verified.

Figure 8:
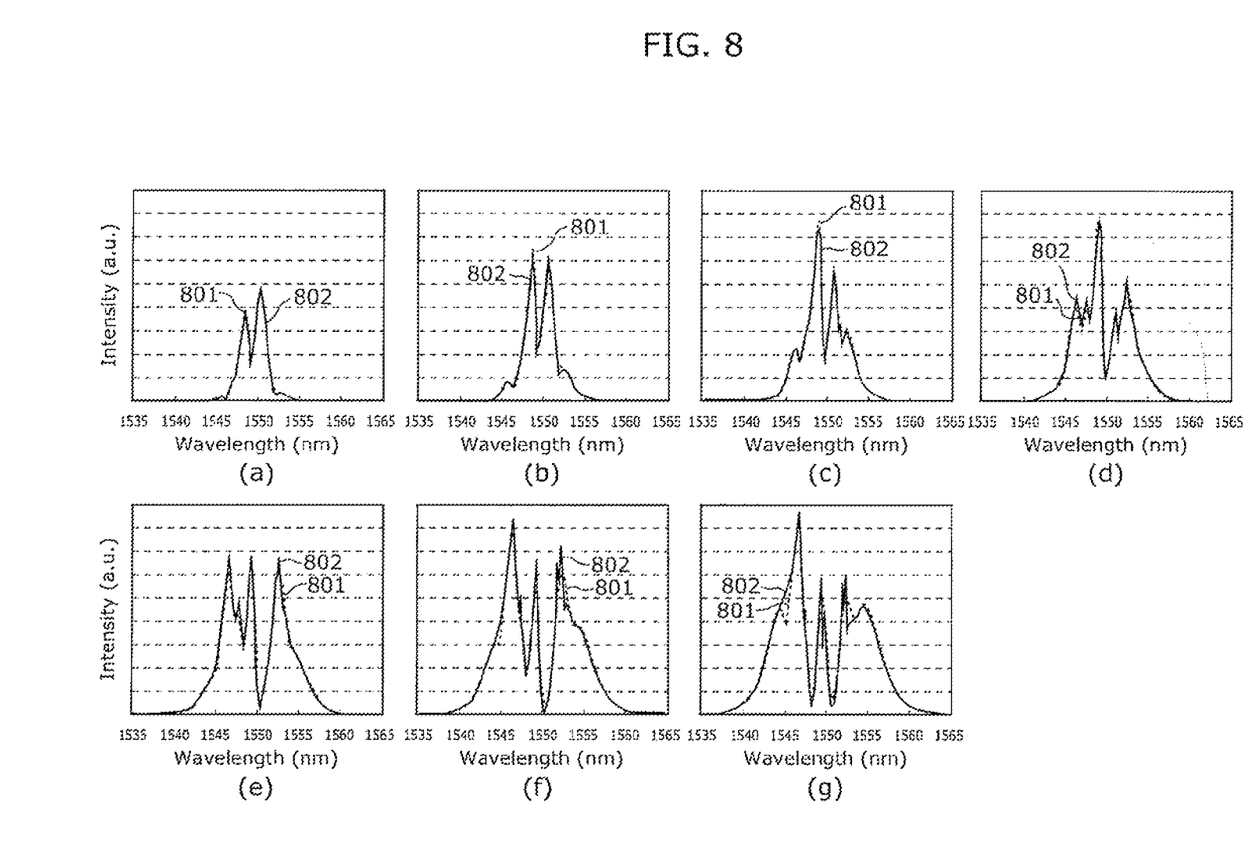
FIG. 8 is a graph showing a comparison result of a measured value and a calculated value of power spectrums of an output optical signal, each of which has a corresponding one of seven types of intensities of an input optical signal.

FIG. 8 is a graph showing a comparison result of a measured value and a calculated value of power spectrums of an output optical signal, each of which has a corresponding one of the seven types of intensities of the input optical signal. It is to be noted that the calculated value of the power spectrum is a value of a power spectrum obtained when the evaluation function converged through the repeated calculation. In addition, the seven types of intensities of the input optical signal are intensities when the electrical power of the intensity adjuster 110 is 17.2 mW, 27.5 mW, 37.8 mW, 48.1 mW, 58.4 mW, 68.7 mW, and 79.0 mW.

As shown in (a) to (g) in FIG. 8, a measured value 801 and a measured value 802 are substantially the same. This shows that, in the present experiment, changes of the power spectrum due to self-phase modulation, which are sensitive to the time waveform of the input optical signal, was accurately simulated.

Figure 9:
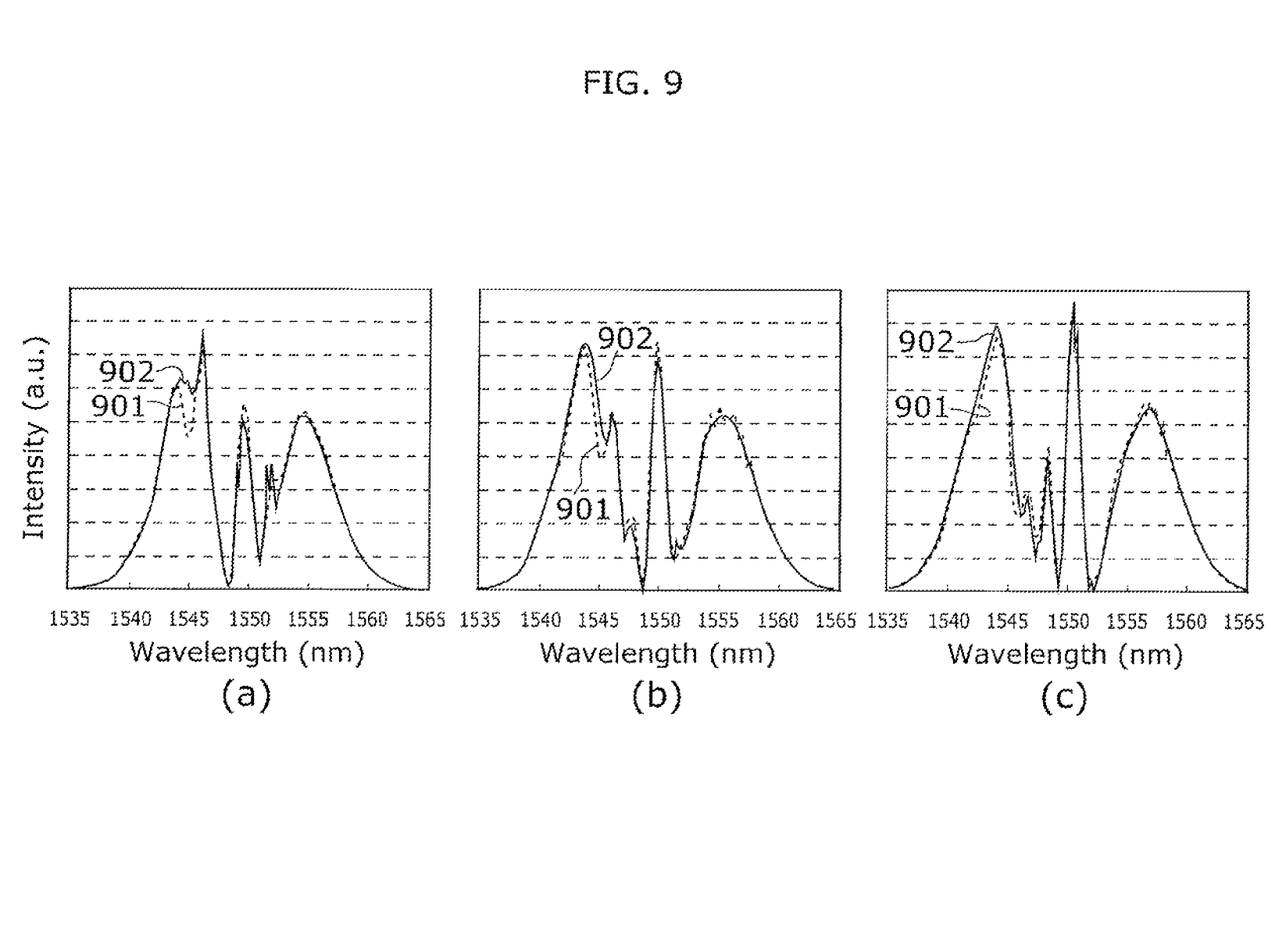
FIG. 9 is a graph showing a comparison result of a measured value and a calculated value of power spectrums of an output optical signal, each of which has a corresponding one of three types of intensities of an input optical signal and is not used for calculating a phase spectrum, among the power spectrums of the output optical signal, each of which has a corresponding one of ten types of intensities of the input optical signal measured by the spectrometer.

FIG. 9 is a graph showing a comparison result of a measured value and a calculated value of power spectrums of an output optical signal, each of which has a corresponding one of three types of intensities of the input optical signal and is not used for calculating the phase spectrum, among the power spectrums of the output optical signal, each of which has a corresponding one of ten types of intensities of the input optical signal and is measured by the spectrometer 130. It is to be noted that the calculated value of the power spectrum is a value at the time when the simulation is performed using the phase spectrum of the input optical signal calculated by the phase spectrum calculation unit 143. In addition, the three types of intensities of the input optical signal, which were not used for the calculation of the is phase spectrum, are intensities when the electrical power of the intensity adjuster 110 is 89.4 mW, 99.7 mW, and 110.0 mW.

As shown in (a) to (g) in FIG. 9, a measured value 901 and a measured value 902 are substantially the same. This means that the power spectrums of the output optical signal are accurately calculated using the phase spectrum calculated by the phase spectrum calculation unit 143, for the intensities of the input optical signal which were not the subject of the evaluation function in the simulated annealing as well. This shows, therefore, that the phase spectrum of the input optical signal calculated by the phase spectrum calculation unit 143 is highly accurate. This means that the time waveform of the input optical signal reconstructed using the phase spectrum of the input optical signal calculated by the phase spectrum calculation unit 143 is also highly accurate.

As described above, the waveform reconstruction system 100 and the waveform reconstruction device 140 according to the above-described embodiment are capable of reconstructing the time waveform of the input optical signal, using the power spectrum of the output optical signal that is output after the input optical signal propagates through the optical fiber which induces self-phase modulation. Therefore, data of time-resolved spectroscopy is not necessarily essential for the waveform reconstruction system 100 and the waveform reconstruction device 140. More specifically, the waveform reconstruction system 100 needs not necessarily include, for reconstructing the time waveform of an optical signal, an ultrafast time gate or a reference light source which are necessary for obtaining data of time-resolved spectroscopy, and thus it is possible to easily reconstruct the time waveform of the optical signal.

In addition, the waveform reconstruction system 100 and the waveform reconstruction device 140 are capable of searching for a difference value equal to or less than a threshold while changing the phase spectrum according to the simulated annealing which is a known technique, and thus it is possible to calculate a phase spectrum with high accuracy in a relatively short amount of time.

The waveform reconstruction device and the waveform reconstruction system according to an aspect of the present invention have been described above based on an embodiment; however, the present invention is not limited to the embodiment described above. Other forms in which various modifications apparent to those skilled in the art are applied to the embodiment are included within the scope of the present invention, unless such changes and modifications depart from the scope of the present invention.

For example, in the above-described embodiment, the phase spectrum calculation unit 143 calculates the phase spectrum of the input optical signal by searching for a phase spectrum when the difference value becomes equal to or less than a threshold while changing the phase spectrum according to simulated annealing; however, the waveform reconstruction device and the waveform reconstruction system according to an aspect of the present invention are not limited to the waveform reconstruction device and the waveform reconstruction system described above. For example, the phase spectrum calculation unit 143 may search for the phase spectrum when the difference value becomes equal to or less than a threshold while changing the phase spectrum according to a genetic algorithm. More specifically, for the waveform reconstruction device and the waveform reconstruction system according to an aspect of the present invention, any algorithm can be used as long as the algorithm is for calculation of the phase spectrum when the evaluation function becomes the smallest in the case where the difference value equal to or less than a threshold is the evaluation function. In addition, the phase spectrum calculation unit 143, for example, may search for the phase spectrum when the difference value becomes equal to or less than a threshold while changing the phase spectrum in a random manner without using an algorithm.

Furthermore, the highly nonlinear optical fiber 120 is an optical fiber having known parameters in which up to the fourth-order dispersion is considered in the above-described embodiment; however the optical fiber may have known parameters in which higher order dispersion is considered.

Furthermore, the present invention can be implemented as a waveform reconstruction method for executing processes performed by characteristic elements of the waveform reconstruction device described above. In addition, the present invention can be implemented as a program which causes a computer as shown in FIG. 10 to execute the waveform reconstruction method. Furthermore, such a program may be distributed via recording medium such as a CD-ROM and communication medium such as the Internet.

FIG. 10 is a diagram illustrating an example of a hardware configuration of a computer. A program for causing a computer to execute the waveform reconstruction method is stored in a CD-ROM 515 which is a computer readable medium and read via a CD-ROM device 514, for example. Furthermore, the program for causing a computer to execute the waveform reconstruction method is transmitted via a wired or wireless network, broadcasting, or the like, for example.

The computer 500 includes: a central processing unit (CPU) 501; a read only memory (ROM) 502; a random access memory (RAM) 503; a hard disk 504; a communication interface 505, and so on.

The CPU 501 executes a program read via the CD-ROM device 514 or a program received via the communication interface 505. More specifically, the CPU 501 develops, into the RAM 503, the program read via the CD-ROM device 514 or the program received via the communication interface 505. Then the CPU 501 executes each coded instruction in the program developed into the RAM 503.

The ROM 502 is a read-only memory which stores a program and data necessary for operation of the computer 500. The RAM 503 is used as a work area when the CPU 501 executes the program. More specifically, the RAM 503 temporarily stores data such as a parameter for executing the program, for example. The hard disk 504 stores the program, the data, and so on.

The communication interface 505 performs communication with other computers via a network. A bus 506 interconnects the CPU 501, the ROM 502, the RAM 503, the hard disk 504, the communication interface 505, a display 511, a keyboard 512, a mouse 513 and the CD-ROM device 514.

INDUSTRIAL APPLICABILITY

A waveform reconstruction device and a waveform reconstruction system according to an aspect of the present invention can be used as a measurement device for a time waveform of an ultrafast light pulse used in a research field such as optical communications. Particularly, utilization of an optical communication coding which uses a phase and the nonlinear optical signal processing that is sensitive to the status of an light pulse have particularly been actively researched or used in recent years. Therefore, the waveform reconstruction device and the waveform reconstruction system according to an aspect of the present invention which are capable of easily measuring an accurate time waveform are highly useful not only in an industrial field but also in a field of the fundamental science.

REFERENCE SIGNS LIST 100 waveform reconstruction system
110 intensity adjuster
120 highly nonlinear optical fiber
130 spectrometer
140 waveform reconstruction device
141 input spectrum obtaining unit
142 output spectrum obtaining unit
143 phase spectrum calculation unit
144 waveform reconstruction unit

The invention claimed is:

1. A waveform reconstruction device which reconstructs a time waveform of an input optical signal, said waveform reconstruction device comprising:
an input spectrum obtaining unit configured to obtain a power spectrum of the input optical signal;
an output spectrum obtaining unit configured to obtain, as a measured power spectrum, a power spectrum for each of a plurality of intensities of the input optical signal, the power spectrum being obtained by measuring an output optical signal that is output after the input optical signal propagates through an optical fiber that induces self-phase modulation;
a phase spectrum calculation unit configured to (i) calculate as a calculated power spectrum, for each of the plurality of intensities of the input optical signal, a power spectrum of the output optical signal when a phase spectrum of the input optical signal having the plurality of intensities is assumed to have a given phase spectrum, by simulating the propagation of the input optical signal through the optical fiber using a parameter related to the self-phase modulation of the optical fiber, and (ii) calculate as the phase spectrum of the input optical signal, the given phase spectrum when a difference value between the calculated power spectrum and the measured power spectrum is equal to or less than a threshold; and
a waveform reconstruction unit configured to reconstruct a time waveform of the input optical signal by performing frequency-time transform on the phase spectrum calculated by said phase spectrum calculation unit and the power spectrum obtained by said input spectrum obtaining unit.

2. The waveform reconstruction device according to claim 1,
wherein said phase spectrum calculation unit is configured to search, changing the given phase spectrum according to a predetermined algorithm, for the given phase spectrum when the difference value becomes equal to or less than the threshold so as to calculate the phase spectrum of the input optical signal.

3. A waveform reconstruction system for reconstructing a time waveform of an input optical signal, said waveform reconstruction system comprising:
an intensity adjuster which changes an intensity of the input optical signal into a plurality of intensities different from each other;
an optical fiber which induces self-phase modulation of an optical signal that propagates through said optical fiber and which has a known parameter related to the self-phase modulation;
a spectral measurement device which measures a power spectrum of an output optical signal for each of the plurality of intensities, the output optical signal being output after the input optical signal whose intensity has been changed by said intensity adjuster propagates through said optical fiber; and
said waveform reconstruction device according to claim 1,
wherein said output spectrum obtaining unit is configured to obtain, as the measured power spectrum, the power spectrum measured by said spectral measurement device.

4. The waveform reconstruction device according to claim 3,
wherein said optical fiber has known parameters related to self-phase modulation of at least second-order dispersion, third-order dispersion, and fourth-order dispersion.

5. A waveform reconstruction method for reconstructing a time waveform of an input optical signal, said waveform reconstruction method comprising:
obtaining a power spectrum of the input optical signal;
obtaining, as a measured power spectrum, a power spectrum of an output optical signal, for each of a plurality of intensities of the input optical signal, by measuring the output optical signal that is output after the input optical signal propagates through an optical fiber that induces self-phase modulation;
calculating a phase spectrum by (i) calculating as a calculated power spectrum, for each of the plurality of intensities of the input optical signal, a power spectrum of the output optical signal when the phase spectrum of the input optical signal having the plurality of intensities is assumed to have a given phase spectrum, by simulating the propagation of the input optical signal through the optical fiber using a parameter related to the self-phase modulation of the optical fiber, and (ii) calculating as the phase spectrum of the input optical signal, the given phase spectrum when a difference value between the calculated power spectrum and the measured power spectrum is equal to or less than a threshold; and
reconstructing a time waveform of the input optical signal by performing frequency-time transform on the phase spectrum calculated in said calculating a phase spectrum and the power spectrum obtained in said obtaining a power spectrum of the input optical signal.

6. A non-transitory computer-readable medium having a program stored thereon for causing a computer to execute said waveform reconstruction method according to claim 5.

* * * * *